(12) United States Patent
Stauss et al.

(10) Patent No.: US 10,519,997 B2
(45) Date of Patent: Dec. 31, 2019

(54) PIECE OF FURNITURE, AND FURNITURE FITTING FOR CONNECTING FURNITURE PARTS

(71) Applicant: HETTICH FRANKE GMBH & CO. KG, Balingen-Weilstetten (DE)

(72) Inventors: Gerd Stauss, Winterlingen (DE); Oliver Nill, Hechingen (DE)

(73) Assignee: HETTICH FRANKE GMBH & CO. KG, Balingen-Weilstetten (DE)

( * ) Notice: Subject to any disclaimer, the term of this patent is extended or adjusted under 35 U.S.C. 154(b) by 218 days.

(21) Appl. No.: 15/555,145

(22) PCT Filed: Mar. 2, 2016

(86) PCT No.: PCT/EP2016/054405
§ 371 (c)(1),
(2) Date: Sep. 1, 2017

(87) PCT Pub. No.: WO2016/139237
PCT Pub. Date: Sep. 9, 2016

(65) Prior Publication Data
US 2018/0045234 A1 Feb. 15, 2018

(30) Foreign Application Priority Data

Mar. 5, 2015 (DE) .......................... 10 2015 103 225
Jan. 18, 2016 (DE) .......................... 10 2016 100 753

(51) Int. Cl.
*F16B 12/10* (2006.01)
*F16B 12/26* (2006.01)
*A47C 17/86* (2006.01)

(52) U.S. Cl.
CPC .............. *F16B 12/26* (2013.01); *A47C 17/86* (2013.01)

(58) Field of Classification Search
CPC .............. Y10T 403/59; Y10T 403/591; Y10T 403/599; Y10T 403/60; Y10T 403/602;
(Continued)

(56) References Cited

U.S. PATENT DOCUMENTS 3,989,298 A * 11/1976 Cycowicz ................ A47C 4/02
297/342
4,148,106 A * 4/1979 Gallien ................ A47C 19/005
297/440.1
(Continued)

FOREIGN PATENT DOCUMENTS

| AT | 502027 | 1/2007 |
|----|--------|--------|
| DE | 805178 | 5/1951 |

(Continued)

*Primary Examiner* — Michael P Ferguson
(74) *Attorney, Agent, or Firm* — Collard & Roe, P.C.

(57) ABSTRACT

A furniture fitting for connecting furniture parts of upholstered furniture has a first fitting part for fastening to a first furniture part and a second fitting part fastenable to a second furniture part. The first fitting part has a base and two axles arranged parallel to one another and parallel to the base. A first one of the axles is fixedly connected to the first fitting part and a second one of the axles is displaceably mounted relative to the first axle perpendicular to the axles against a force of an energy storage device. The second fitting part has a first and a second mount for the first and second axle and is positioned on the first axle with the first mount to pivot around the first axle. The second axle latches into the second mount during pivoting to connect the two fitting parts to each other.

16 Claims, 12 Drawing Sheets

(58) Field of Classification Search
CPC .......... F16B 12/10; F16B 12/20; F16B 12/32;
F16B 12/12; F16B 12/26; F16B 12/38;
F16B 12/56; F16B 12/60; A47C 4/02;
A47C 4/021; A47C 4/022; A47C 13/00;
A47C 13/005; A47C 7/546
See application file for complete search history.

(56) References Cited

U.S. PATENT DOCUMENTS

| | | | | |
|---|---|---|---|---|
| 4,148,454 A * | 4/1979 | Carlson | ................... | F16B 12/38 |
| | | | | 108/152 |
| 6,637,812 B2 * | 10/2003 | Laughlin | ................... | A47C 4/02 |
| | | | | 297/118 |
| 7,252,339 B2 * | 8/2007 | Owens | ..................... | A47C 4/02 |
| | | | | 297/440.1 |
| 8,764,114 B1 * | 7/2014 | Frank | ..................... | A47C 4/028 |
| | | | | 297/248 |
| 2007/0120410 A1 | 5/2007 | Wiecek | | |

FOREIGN PATENT DOCUMENTS

| | | | | |
|---|---|---|---|---|
| DE | 25 46 903 | | 4/1977 | |
| DE | 20 2010 007 430 | * | 9/2011 | ............. A47B 88/00 |
| EP | 2 792 276 | | 10/2014 | |
| EP | 2 796 074 | | 10/2014 | |

\* cited by examiner

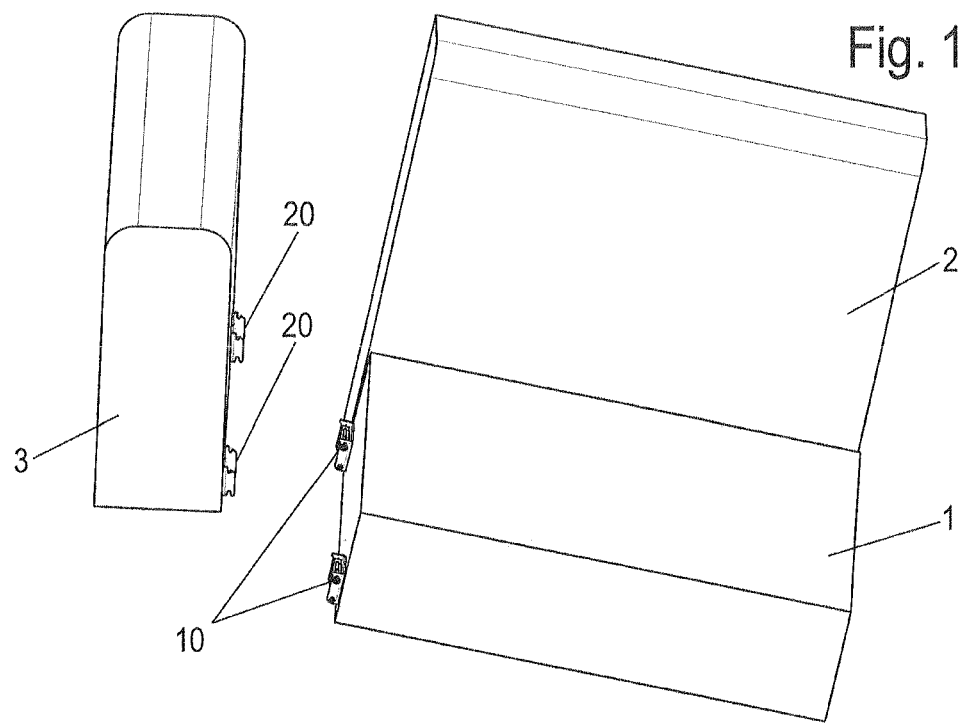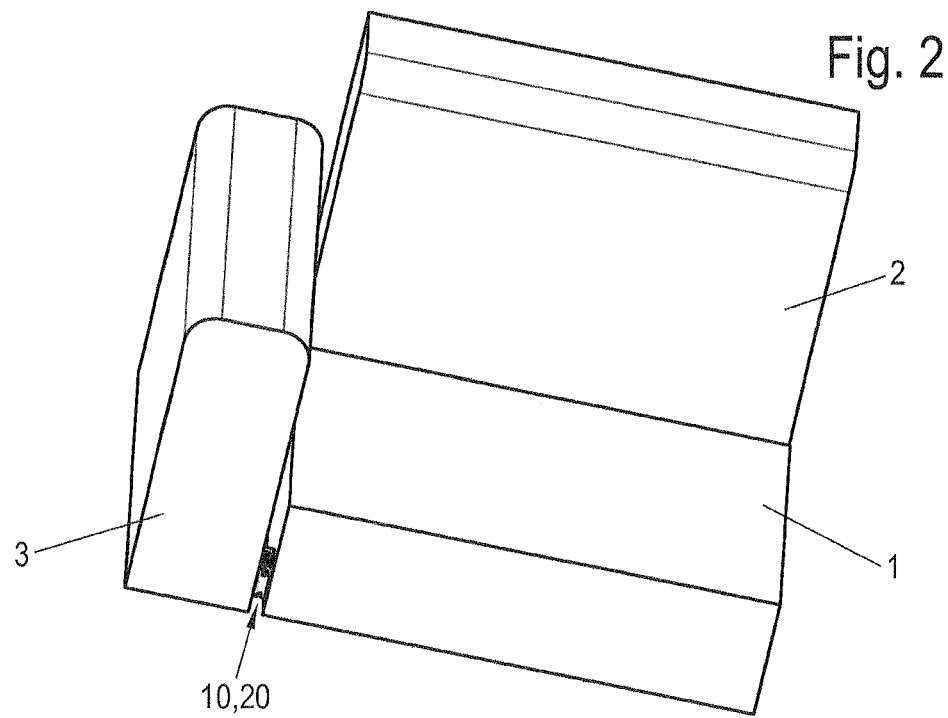

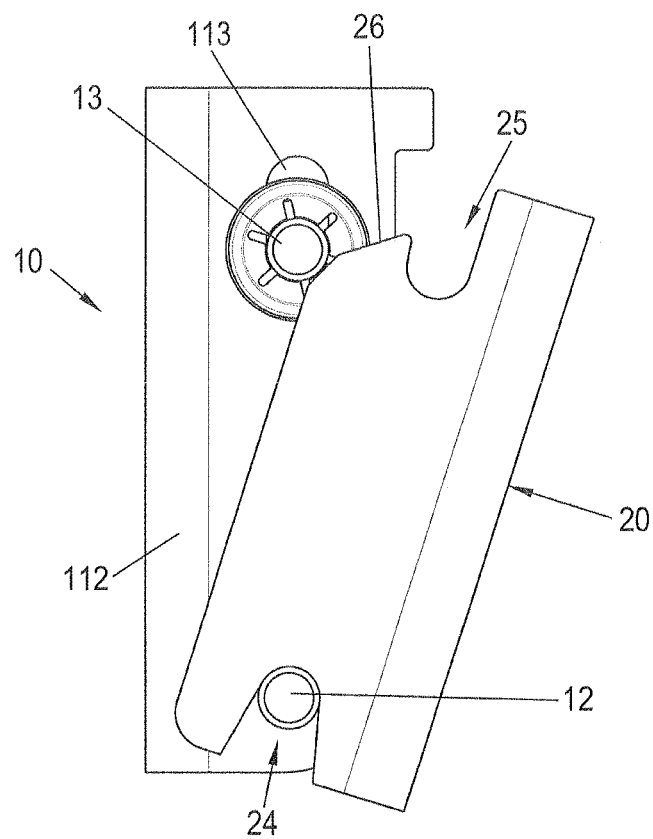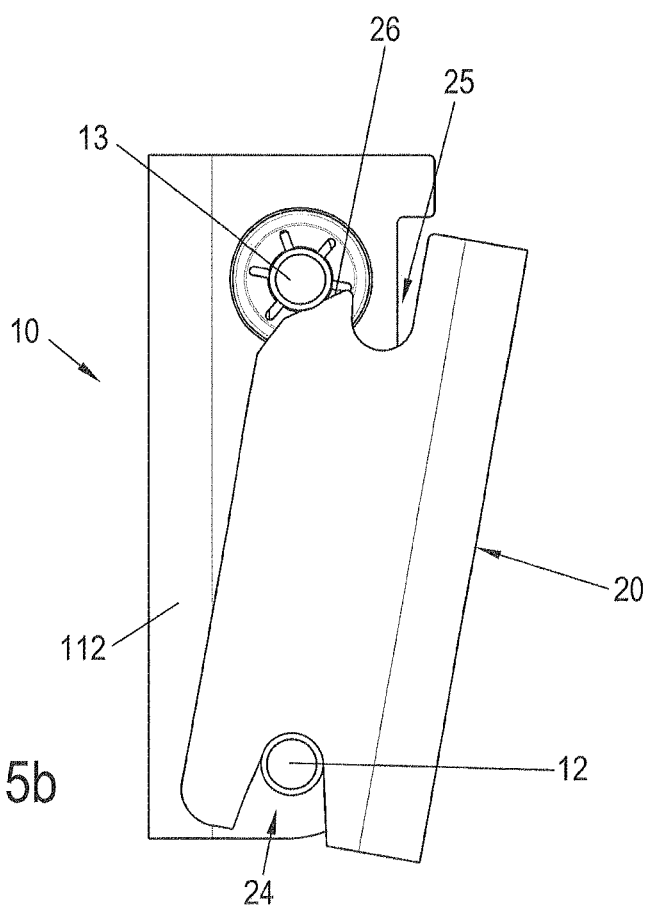

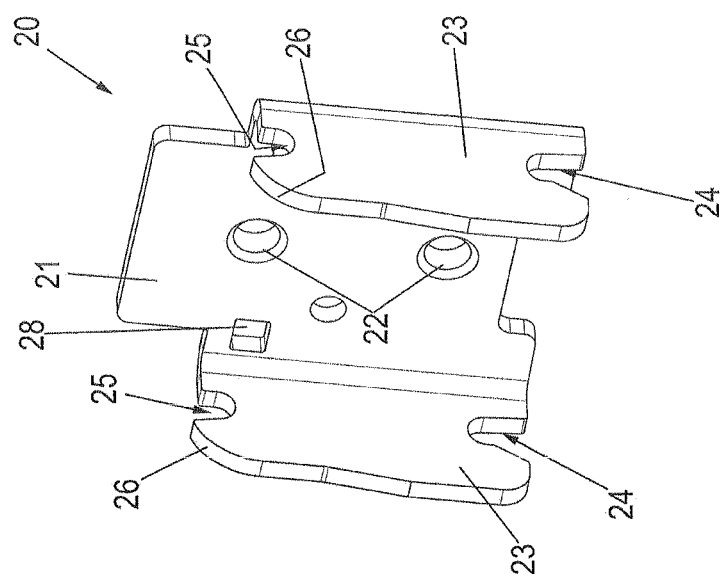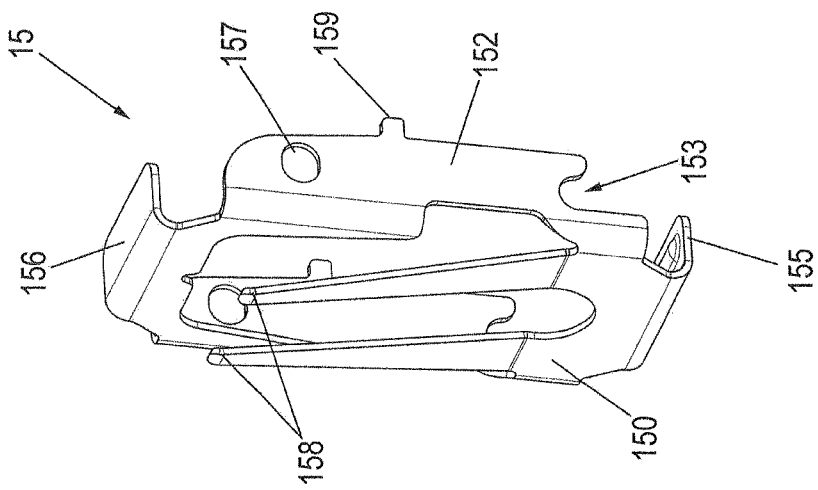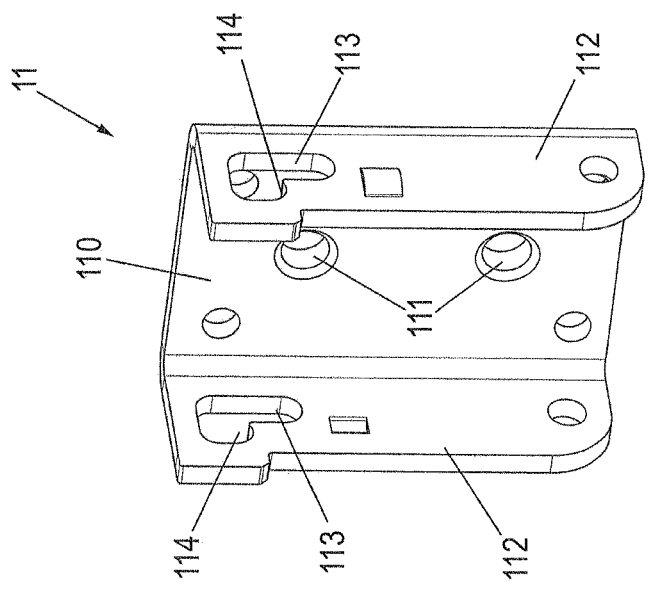

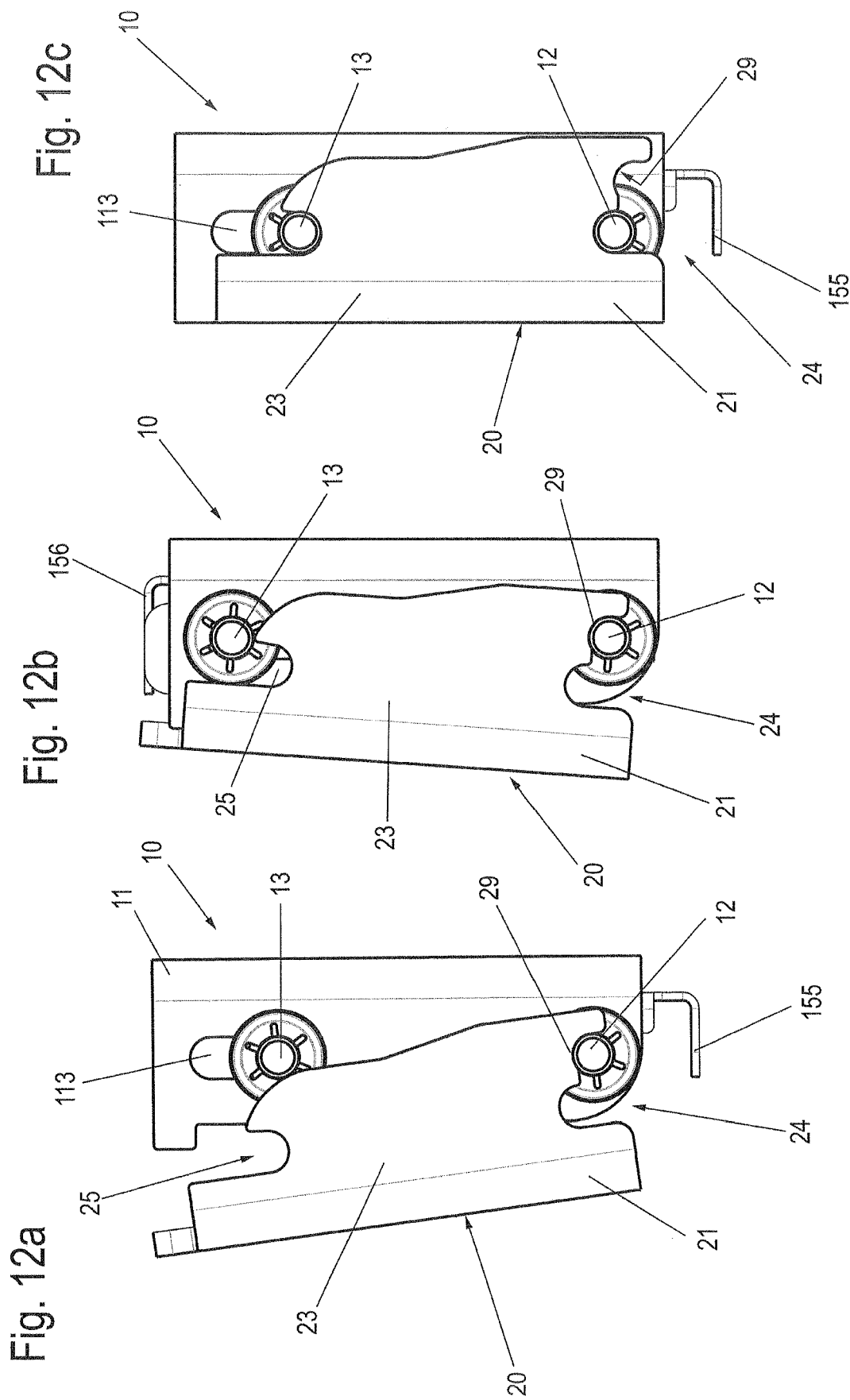

PIECE OF FURNITURE, AND FURNITURE FITTING FOR CONNECTING FURNITURE PARTS

CROSS-REFERENCE TO A RELATED APPLICATIONH

The invention described and claimed hereinbelow is a National Stage Application of PCT/EP2016/054405, filed on Mar. 2, 2016 (the PCT application), now filed in the United States under 35 USC § 371. The PCT application claims priority from German Patent Application DE 10 2015 103225.2, filed on Mar. 5, 2015, and from German Patent Application DE 10 2016 100753.6, filed on Jan. 18, 2016. The contents of the PCT application and the respective German Patent Applications are incorporated by reference herein.

BACKGROUND OF THE INVENTION

The invention relates to a furniture fitting for connecting furniture parts, in particular upholstered furniture, having a first fitting part which can be fastened to a first furniture part and a second fitting part which can be fastened to a second furniture part. The invention also relates to a piece of furniture with at least two furniture parts.

Frequently, plug-type connectors are used for connecting large furniture parts such as, for example, seat parts, backrests or side parts of upholstered furniture. It is a disadvantage of such plug-type connectors that they are loosened again during movement of the furniture against the direction of the joining during connection. As an alternative or in addition, connection pieces which are mounted on the outside are used for such large furniture parts, which is possible only in non-visible areas, for example on an underside of a sofa, because of the risk of injury and for reasons of design.

The document AT 502 027 A4 describes a holder for a box-shaped article in which pin-shaped fixing elements protruding on opposite side faces of the article are provided which cooperate in complementary receptacles on the holder which at least partially engage beyond the side faces of the article. The object is inserted with at least one of the fixing elements into the associated recess and pivoted in such a way that it also engages with the associated second fastening element in the associated second recess. A renewed pivoting out of the second recess is prevented by means of an additional connecting element, for example a screw or a snap connection, which is formed between the object and the holder. Forces between the holder and the object are essentially determined by the fixing elements or the recesses. The additional connection merely needs to absorb any acting torques as well as pulling and pushing forces between the object and the holder which act counter to the pivoting direction or in each case at right angles to the pivoting direction.

The connection method described in the document AT 502 027 A4 is therefore well suited for absorbing large forces. The necessity to provide an additional screw and/or latching connection in addition to the fixing elements or recesses complicates the principle presented, however, which makes it difficult to apply within a furniture fitting. A screw connection as an additional connection is again disadvantageous in the case of such a furniture fitting due to a risk of injury and for design reasons. A separate latching connection as an additional connection is problematic in that it would have to be suitable to absorb the potentially large torques between furniture parts, for example between a seat part and a backrest or a seat part and an armrest of an upholstered furniture.

OBJECTS AND SUMMARY OF THE INVENTION

It is an object of the present invention to provide a furniture fitting of the type mentioned initially for furniture parts, in particular for large furniture parts of upholstered furniture, which can absorb large forces and torques acting between the furniture parts after connection and creates a concealed connection which can easily be produced as far as possible without tools. It is a further object of the present invention to provide a piece of furniture with easy-to-connect furniture parts.

This object is achieved by a furniture fitting or a piece of furniture with the features of the respective independent claim. Advantageous embodiments and further developments are specified in the dependent claims.

A furniture fitting according to the invention of the type mentioned above is characterized in that the first fitting part has a base and two axles arranged parallel to one another and parallel to the base, wherein a first of the axles is fixedly connected to the first fitting part and a second of the axles is mounted such that it can be displaced relatively to the first axle, counter to a force of an energy storage device, in a direction perpendicular to the axles. The second fitting part has a first and a second mount for the first and second axle, respectively, wherein the second fitting part can be positioned on the first axle with the first mount and can be pivoted about the first axle, and the second axle latches into the second mount during pivoting so as to connect the two fitting parts to each other.

Due to the latching of the second axle in the corresponding mount, an additional connecting element between the two fitting parts can be dispensed with. The connection of the furniture parts can be effected by means of the latching process without tools and in a concealed manner.

In an advantageous embodiment of the furniture fitting, the first fitting part has a U-shaped base element which comprises the base and two limbs, wherein the axles penetrate the limbs and project in each case on both sides beyond outer surfaces of the limbs. At least one of the limbs of the base element of the first fitting part is preferably formed with a projection which prevents a parallel displacement of the second fitting part relative to the base element in the assembled state of the furniture fitting. This results in additional stability of the furniture fitting in the latched state.

In a further advantageous embodiment of the furniture fitting, the second fitting part is also U-shaped with a base and limbs, wherein the first mount is formed respectively by a first recess in the limbs, and the second mount is formed respectively by an opposing second recess in the limbs. The U-shaped basic shape of the fitting parts allows a high load-bearing capacity of the fitting in combination with simple construction. The axles of the first fitting part projecting beyond the limbs serve as bolt-like elements which engage in the recesses in the second fitting part.

It is noted that the axles, in particular the first axle, do not have to be formed in a continuous manner. Within the framework of the application, bolt-like tabs, which protrude from the limbs of the first fitting part, represent a first axle for example. The second fitting part can also be placed on the projecting bolt-like tabs and can be pivoted about these sections.

The first recess and the second recess are particularly preferably arranged respectively on opposite side edges of the limb and are open in each case in the direction of the side edge. The outwardly open first recess can thus be placed on the first axle, wherein the second recess, which is open in the opposite direction, forms a latching recess into which the second axle, which is acted upon by spring force, engages. In this geometry, at least one tension spring, which acts on the first and the second axle, can be used as an energy storage device. A guide of the second axle in the base element can be constructed structurally simply in elongated holes, which are formed in the limbs.

Further preferably, the first recess widens towards the side edge of the limb in a V-shaped manner, as a result of which a guiding action is provided when the second fitting part is placed on the first fitting part. Thus, the assembly of even heavy furniture parts is simplified, which can be precisely positioned only with much difficulty.

In a further preferred embodiment of the furniture fitting, the first recess of the second fitting part is cut open in the direction of the longitudinal edge of the limb. By means of this clearance, it is possible to latch the second fitting part onto the first fitting part not only in a pivoting movement, but also in a (linear) sliding movement towards the latter. Through this design of the furniture fitting, furniture parts can be connected to one another with several furniture fittings, even if they are not arranged in a line.

In a further preferred embodiment of the furniture fitting, an additional recess is formed on a side of the first recess facing away from the base. Due to the recess provided in addition to the latching recess, the two furniture fitting parts can be latched at a relatively flat angle to one another.

In order to support the latching process, in a further preferred embodiment, a guide bevel for the second axle is provided on a free longitudinal side of the respective limb in the region of the second recess.

In a further advantageous embodiment of the furniture fitting, a likewise U-shaped unlatching plate with a base and limbs is inserted into the base element. The unlatching plate is connected by its limbs to the second axle and displaceable relative to the first axle and the base element. At least one unlatching tab is preferably formed on at least one side of the unlatching plate extending at right angles to the limbs.

In order to separate the fitting parts when dismounting the piece of furniture, it is necessary to displace the second axle relative to the first one in order to release the resulting latching. This is facilitated by the unlatching plate. Depending on the arrangement of the unlatching tab on the unlatching plate, either a pressure or a pull on the unlatching tab may be applied to the unlatching plate in order to displace the unlatching plate within the U-shaped base element and to thus move the second axle out of the latched connection. The unlatching plate thereby prevents an oblique position of the second axle, even if the unlatching tabs are not actuated exactly centrally above or below the point of application of the energy storage device, e.g. the aforementioned tension spring. In addition, guide lugs can protrude from the base of the unlatching plate, which form at least a lateral guide for the tension spring.

In a further advantageous embodiment of the furniture fitting, elongated holes for guiding the second axle are formed in an L-shaped manner in the limbs of the base element. In this case, a section of the elongated hole runs transversely to the base of the base element and provides a set-down position for the second axle in a tensioned state of the at least one tension spring. In this way, the first fitting part can be latched in a state with an already tensioned tension spring with the second fitting part, as a result of which the latching process requires only small forces when the fitting parts are assembled.

Preferably, the unlatching plate has at least one spring element in order to press the unlatching plate at least in a region of the second axle away from the base of the base element and to hold the second axle in the set-down position and/or move it into the set-down position. When pretensioning the at least one tension spring or when separating the two fitting parts by means of the unlatching plate, the second axle is automatically brought into the set-down position by the at least one spring element. The at least one spring element can, for example, be formed in a simple and cost-effective manner by a spring tongue which protrudes from the base of the unlatching plate, or alternatively by a separate component, for example a leg spring.

The furniture fitting can be produced particularly simply and inexpensively if the base element and/or the unlatching plate and/or the second fitting part are made of sheet metal, preferably in a punching and bending process.

A piece of furniture according to the invention with at least two furniture parts is characterized in that it comprises at least one such furniture fitting for connecting the at least two furniture parts. The advantages described in connection with the furniture fitting are obtained.

BRIEF DESCRIPTION OF THE DRAWING FIGURES

The invention will be explained below in closer detail by reference to an embodiment shown in the drawings, wherein:

FIG. 1 shows a schematic isometric view of a piece of furniture with several, partly mutually separated furniture parts with furniture fittings;

FIG. 2 shows the piece of furniture shown in FIG. 1 with assembled furniture parts;

FIG. 5a is a schematic side view of the furniture fitting of FIG. 4, in a stage of a latching process;

FIG. 5b is a schematic side view of the furniture fitting of FIG. 4, in another stage of the latching process;

FIG. 6b shows an isometric view of a furniture fitting in the second exemplary embodiment in a different latching state than that depicted in FIG. 6a;

FIG. 8a shows an isometric view of a component of the furniture fitting according to FIGS. 6a, b;

FIG. 8b shows an isometric view of another component of the furniture fitting according to FIGS. 6a, b;

FIG. 8c shows an isometric view of another component of the furniture fitting according to FIGS. 6a, b;

FIG. 11b shows a schematic representation for illustrating the assembly of the furniture parts of the piece of furniture according to FIG. 11a;

FIG. 12a shows a side view of a furniture fitting in a fourth exemplary embodiment in a latching state;

FIG. 12b shows another side view of a furniture fitting in a fourth exemplary embodiment in a latching state that is different than that shown in FIG. 12a; and FIG. 12c shows another side view of a furniture fitting in a fourth exemplary embodiment in a latching state that is different than that shown in FIGS. 12a and 12b.

DETAILED DESCRIPTION OF THE INVENTION

Figure 3:
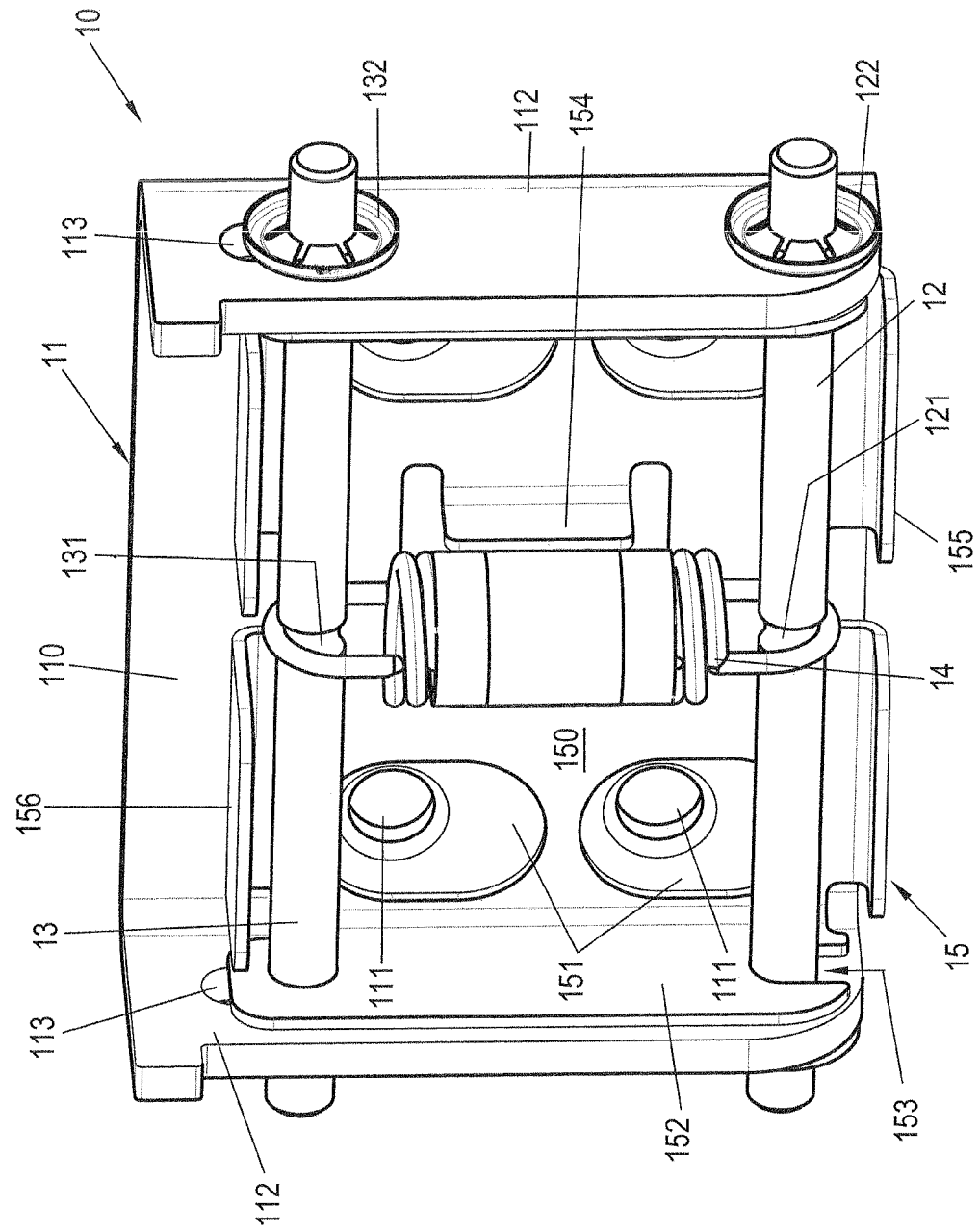
FIG. 3 shows an isometric view of a first fitting part of a furniture fitting in a first exemplary embodiment.

FIGS. 1 and 2 show in each case in an isometric schematic drawing a piece of seating furniture composed of several furniture parts. Specifically, the illustrations show a sofa with a seat part 1, a backrest 2 and an armrest 3. Furniture fittings are provided for connecting the individual furniture parts, each of which has a first fitting part 10 and a second fitting part 20. The first fitting part 10 is respectively fixed to one of the furniture parts, e.g. by means of screws, and the associated second fitting part 20 is placed and fastened to one of the other furniture parts, which is to be arranged on the furniture part to be connected, in such a way that the intended arrangement with one another occurs in line with the position.

In the example shown in FIG. 1, the seat part 1 and the backrest 2 are already connected to one another. For the connection of the armrest 3, two furniture fittings are provided in this case, of which in each case the first fitting part 10 is mounted on the seat part 1 and the second fitting part 20 is mounted on the armrest 3. The armrest 3 is placed against the seat part 1 in a slightly inclined position, as shown in FIG. 1, by placing the second fitting parts 20 in their lower region on the first fitting parts 10. The armrest 3 is then pivoted into a vertical position, whereby the first and the second fitting parts 10, 20 of the furniture fittings engage with one another and the armrest 3 is secured against the seat part 1.

The thus produced assembled state of the furniture is shown in FIG. 2. The furniture fittings are arranged completely concealed in the cushion gap between the seat part 1 and the armrest 3 and are no longer visible when the appropriate cushion volume is provided.

The number of two furniture fittings used between the seat part 1 and the armrest 3 in this example is purely illustrative. The number of furniture fittings used to connect furniture parts can be varied depending on the size of the furniture parts and the load.

In FIG. 3, the first fitting part 10, which in the example shown in FIGS. 1 and 2 is fastened to the seat part 1, is shown in more detail in an isometric drawing. It is pointed out that in the description of the figures terms such as above, below, left, right, front, rear, etc. relate exclusively to the exemplary illustration chosen in the drawings. The aforementioned terms are not to be understood as limiting.

The first fitting part 10 comprises a U-shaped base element 11 which is preferably manufactured from sheet metal, e.g. steel plate or aluminium plate. It is particularly advantageous to manufacture the U-shaped base element 11 in a punching and bending process. The base element 11 has a base 110, in which four fastening holes 111 are arranged in this case.

On the side, limbs 112 protrude essentially at a right angle from the base 110. A respective bore is inserted into the respective lower regions (referring to the representation of FIG. 3) of the limbs 112, through which a first axle 12 is guided. The axle 12 runs parallel and spaced from the plane of the base 110 and also parallel to a lower edge of the base 110. The length of the first axle 12 exceeds the distance of the two limbs 112 in such a way that the axle 12 extends on both sides beyond the outer surfaces of the limbs 112. The first axle 12 is secured against lateral displacement by means of shaft retainers 122 which are fitted externally on the axle 12 and which rest against the limbs 112.

In the region of each limb 112, which is located at the top in FIG. 3, a respective elongated hole 113 is inserted. A second axle 13, which has the same length as the first axle 12 and which likewise protrudes on both sides over the outer surfaces of the limbs 112, is guided in these opposing elongated holes 113. The second axle 13 is also oriented parallel to the plane of the base 110 and parallel to the upper edge of the base 110, and thus parallel to the first axle 12. Once again, shaft retainers 132 are inserted from the outside onto the second axle 13. The shaft retainers 132 prevent the axle 13 from slipaxleg out, but allow vertical movement of the axle 13 in a direction parallel to the base 110 along the limbs 112 in the elongated holes 113.

The first and the second axle 12, 13 each have a circumferential groove 121 or 131 in the centre. An eyelet of a spring acting as an energy storage device, which is designed as a tension spring 14, is respectively suspended in this groove. The tension spring 14 pulls the two axles 12, 13 toward one another, whereby, in the illustrated basic state, the second axle 13 is positioned in the lower region of the elongated hole 113. A pretensioning of the tension spring 14 is preferably already provided in the basic state.

Furthermore, an optional unlatching plate 15 is provided on the first fitting part of FIG. 3. This unlatching plate 15 is likewise formed in a U-shaped manner with a base 150 and limbs 152. The dimensions of the unlatching plate 15 are dimensioned such that this can be inserted into the U-shaped base element 11 and can be displaced vertically within said base element 11 (relating to the orientation of the first fastening part 10 in FIG. 3).

In the base 150 of the unlatching plate 15, openings 151 are arranged which expose the fastening holes 111 and thus enable the base element 11 to be mounted on a furniture part. The two axles 12, 13 pass through the limbs 152 of the unlatching plate 15. As shown in FIG. 3, bores are arranged in the limbs 152 for the second, upper axle 13, and elongated recesses 153 are provided for the first, lower axle 12. Correspondingly, the unlatching plate 15 is fixed to the second axle 13, while it is displaceable in the vertical direction in relation the first axle 12. At its lower and upper ends, the base 150 of the unlatching slide 15 is bent, forming a lower unlatching tab 155 and an upper unlatching tab 156.

The function of the first fitting part 10 and in particular of the axles 12, 13 and the unlatching plate 15 are described below in connection with FIGS. 4 and 5a to 5e. Reference numerals in these figures show the same or similarly acting elements as in FIGS. 1 to 3.

Figure 4:
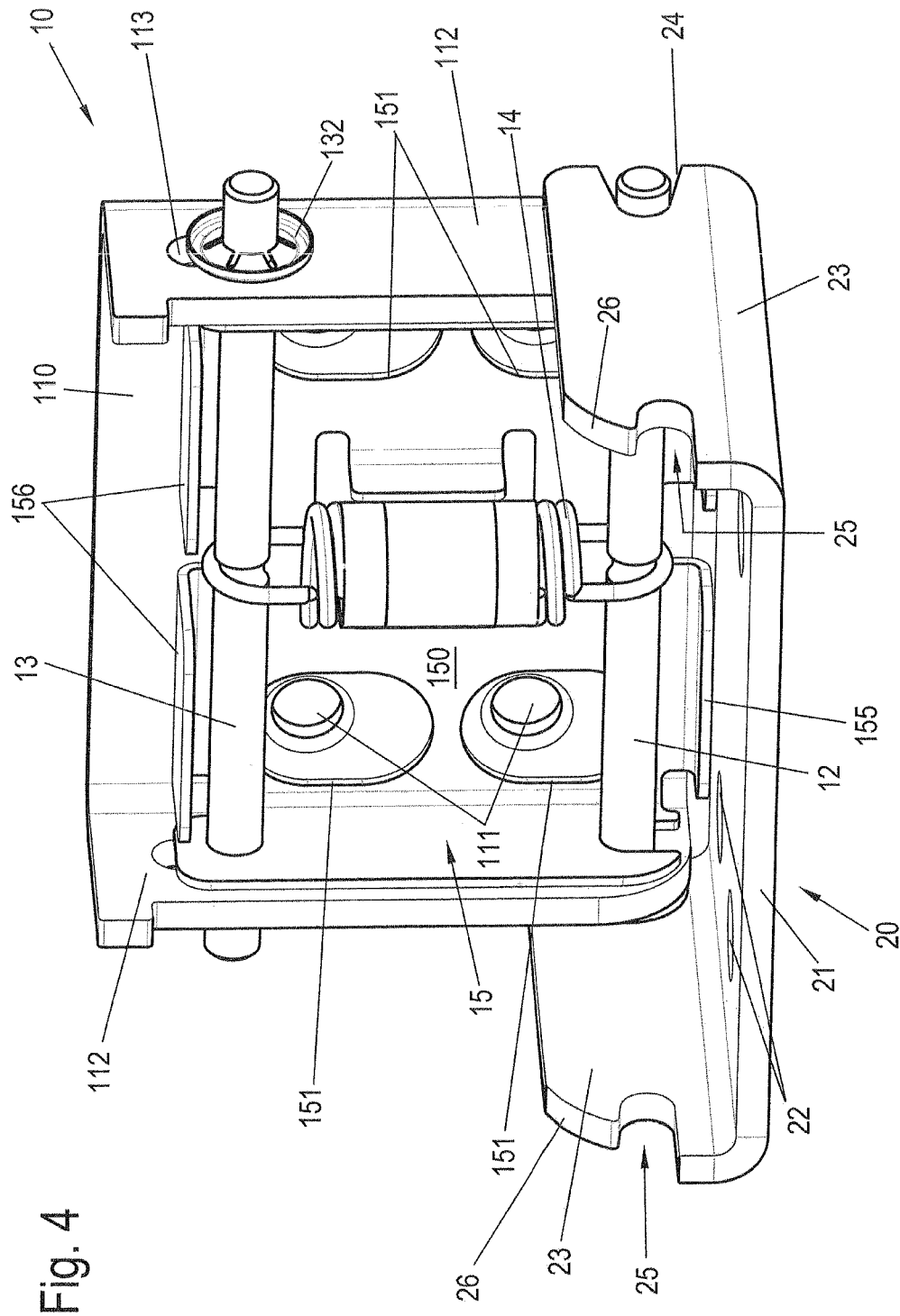
FIG. 4 shows an isometric view of a furniture fitting with the first fitting part according to FIG. 3 and a second fitting part attached.

FIG. 4 shows a furniture fitting consisting of the first fitting part 10 described in connection with FIG. 3 and a second fitting part 20.

The second fitting part 20 is constructed in a U-shaped manner, comparable with the base element 11 of the first fitting part 10, and has a base 21 with vertically projecting limbs 23, which are designed substantially at right angles thereto. Like the base element 11, the second fitting part 20 is preferably made of sheet metal, in particular steel or aluminium sheet, in a punching and bending process. In the base 21, fastening holes 22 are arranged, by means of which the second fitting part 20 can be fixed to a furniture part by means of fastening means.

The two fitting parts 10, 20 are separate parts, which are initially separated from each other, so that they can be completely separated from one another and fixed on the furniture parts to be connected in the correct position. For connecting the furniture parts, the two fitting parts 10, 20 can then be latched together. For this purpose, a first recess 24, which is open toward the side edge, is introduced into the limbs 23 respectively on one of their side edges, which is shown in FIG. 4 on the right. With the first recess 24, the second fitting part 20 is placed on the protruding ends of the first axle 12 of the first fitting part 10. The spacing of the limbs 23 in the second fitting part 20 is selected in such a way that the second fitting part 20 comprises the first fitting part 10, including the shaft retainers 122, 132 which protrude beyond the surfaces of the limbs 112. The first recess 24 is slightly V-shaped and widens towards the side edge of the limbs 23. This facilitates the placement of the second fitting part 20 onto the first fitting part 10, even if the second fitting part 20 is fastened to a heavy furniture part which is not easy to position.

The second fitting part 20 can be pivoted clockwise from the position shown in FIG. 4, wherein the first axle 12 represents a pivot axle. On the opposite side of the limb 23, which is opposite the recess 24, a second recess 25 is arranged into which the second axle 13 can engage in a latching manner. On the free longitudinal edges of the limbs 23, a guide bevel 26 is provided in the region of the second recess 25, by means of which the second axle 13 is raised and guided when the second fitting part 20 is pivoted up until it latches into the second recess 25 due to the spring force of the tension spring 14, as a result of which the two fitting parts 10, 20 are connected to one another.

The process of latching the second axle 13 into the second recess 25 is shown in more detail in FIGS. 5a-5e. FIGS. 5a to 5e each show the furniture fitting with the first fitting part 10 and the second fitting part 20 in a schematic side view.

In FIG. 5a, the second fitting part 20 with the first recess 24 is placed on the protruding ends of the first axle 12 and pivoted up so far that the guide bevel 26 rests against the second axle 13. The second axle 13, in its basic position (see FIGS. 3 and 4) and acted upon by the spring force of the tension spring 14, is disposed at the lower end of the elongated hole 113.

When the second fitting part 20 is pivoted further onto the first fitting part 10 by corresponding pivoting movement of the furniture part connected to the second fitting part 20, the second axle 13 is lifted upwards by the guide bevel 26 within the elongated hole 113. This is shown in two different stages in FIGS. 5b and 5c.

When the second fitting part 20 is further pivoted towards the first fitting part 10, finally the saddle point between the guide bevel 26 and the second recess 25 is pushed through underneath the second axle 13, as a result of which the second axle 13 is pulled into the second recess 25 by the tension spring 14.

As a result of the circular shape of the second axle 13, the tension spring 14 pulls the second fitting part 20 against the first fitting part 10 and thus additionally supports the pivoting movement of the second fitting part 20 as soon as the vertical centre line of the second axle 13 has overcome the saddle point between the guide bevel 26 and the edge of the second recess 25.

The edge of the second recess 25, which adjoins the saddle point, can also extend in a slightly inclined manner relative to the base 21 of the second fitting part 20. When the fitting is engaged by latching, as far as the position in which the base 21 of the second fitting part 20 is arranged on the edges of the limbs 112 of the first fitting part 10, the axle 13 then remains in the position shown in FIG. 5d. If, during the use of the furniture, large forces act on the furniture fitting and, optionally, for example the side edges of the elongated hole 113 are slightly deformed, the second axle 13 can further migrate down in the elongated hole 113. Thus, the resulting clearance in the furniture fitting is compensated until finally the final latching position of the second axle 13 shown in FIG. 5e is reached.

Figure 5C:
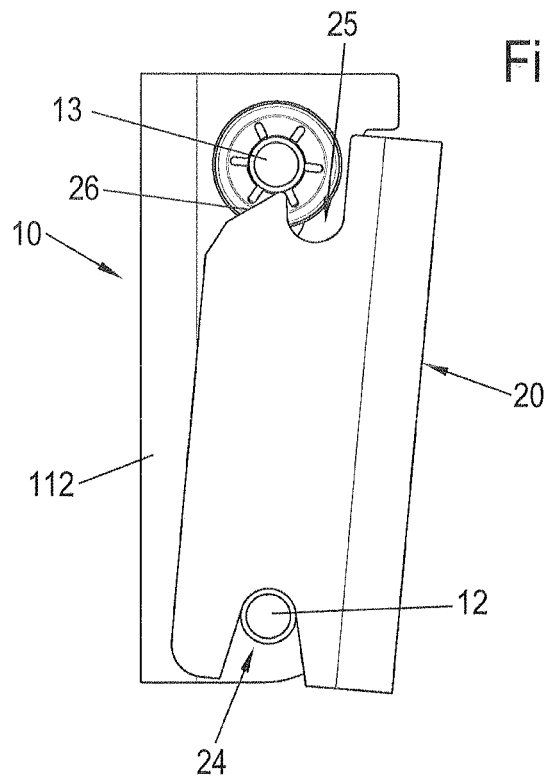
FIG. 5c is a schematic side view of the furniture fitting of FIG. 4, in another stage of the latching process.
Figure 5D:
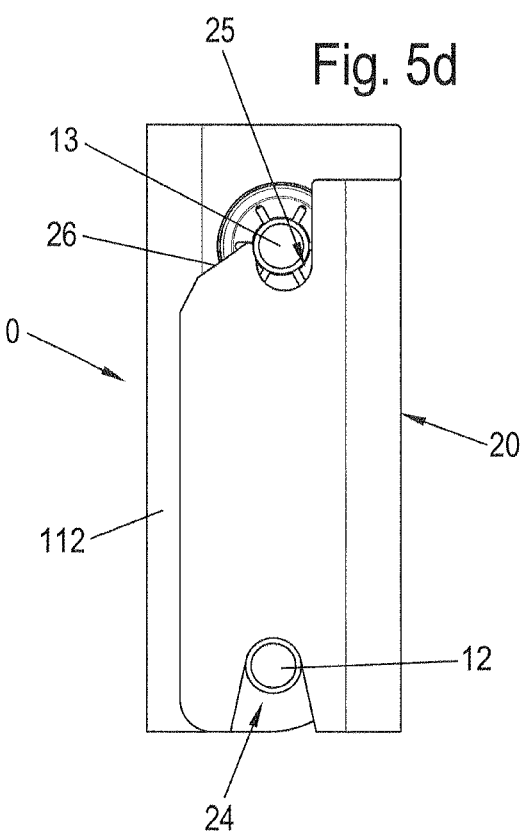
FIG. 5d is a schematic side view of the furniture fitting of FIG. 4, in another stage of the latching process.
Figure 5E:
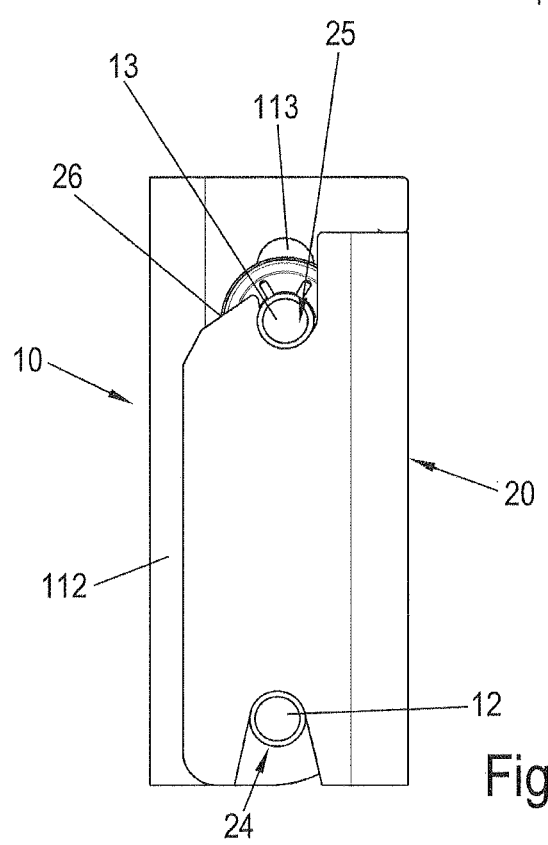
FIG. 5e is a schematic side view of the furniture fitting of FIG. 4, in another stage of the latching process.

In alternative embodiments of the furniture fitting, it can be provided to arrange and shape the second recess 25 in such a way that the second axle 13 already engages in the position shown in FIG. 5e when the furniture fitting is first used.

The connection of the two fitting parts 10, 20 can absorb large forces in all spatial directions and is also particularly suited to absorb torques acting between the first and the second fitting part 10, 20. Even lifting of the second fitting part 20 against the first fitting part 10, by means of which the second axle 13 is lifted in the elongated hole 113, does not result in a separation of the two fitting parts 10, 20, since the second axle 13 remains in the less deep second recess 25 and the movement stroke of the second axle 13 in the elongated hole 113 is not sufficient to allow the first axle 12 to slide out of the lower first recess 24.

The latching connection can be released by lifting the second axle 13 against the force of the tension spring 14 within the elongated holes 113, and the second fitting part 20 is pivoted back in the opposite direction, as shown in the sequence of FIGS. 5a-5e, in relation to the first fitting part 10. After the second fitting part 20 has been pivoted out, it can be lifted off the first axle 12 in order to separate the two fitting parts 10, 20.

The lifting of the second axle 13, which is necessary for the separation, is facilitated by the unlatching plate 15. Either a pressure can be exerted on the lower unlatching tab 155 or a tension on the upper release tab 156 in order to push up the unlatching plate 15 within the U-shaped base element 11 and to thus lift the second axle 13. The unlatching plate 15 thereby prevents an oblique position of the second axle 13, even if the unlatching tabs 155, 156 are not precisely actuated in the middle above or below the point of attack of the tension spring 14 on the second axle 13.

In alternative embodiments, alternatively and/or in addition to the unlatching plate 15, a belt may be attached to the second axle 13, which can be gripped within the cushion gap and on which the second axle 13 can be pulled into the upper unlatching position.

In the exemplary embodiment shown, the tension spring 14 is fixed in its position relative to the axles 12, 13 by the circumferential grooves 121, 131 on the axles 12, 13. In addition, the side position of the tension spring 14 is fixed by guide tabs 154 (see FIG. 3) which protrude from the unlatching plate 15. In an alternative embodiment, a lateral fixing of the tension spring 14 can be effected exclusively by the guide tabs 154, so that the circumferential grooves 121, 131 in the axles 12, 13 can be dispensed with.

In a further advantageous embodiment of the furniture fitting, it is provided that the lateral fixing of the axles 12, 13 is not achieved by way of the inserted shaft retainers 122, 132, but rather the axles 12, 13 are to be fixed by the legs 112 or 152. In this case, the bore in the limbs 112, through which the first axle 12 is guided, can be designed with respect to its diameter in such a way that the axle 12 is pressed in and clamped in the limbs 112. The second axle 13 can be clamped in a comparable manner in correspondingly designed bores in the limbs 152 of the unlatching plate 15.

Furthermore, in another advantageous embodiment of the furniture fitting, the axle 12 can be dispensed with, in that passages are formed on the limbs 112 of the first fitting part 10, which serve as insert axles for the V-shaped recesses 24. As an abutment for the eyelet of the tension spring 14, a tab can protrude from the base 150 of the first fitting part 10.

FIGS. 6-9 show a second exemplary embodiment of a furniture fitting according to the application. In these figures as well as in the following figures, the same reference symbols refer to the same or similarly acting elements as in the above-described figures.

With regard to the basic construction, the furniture fitting shown in FIGS. 6 to 9 is not different from that shown in FIGS. 3 to 5. The corresponding description is hereby explicitly referred to.

Figure 6A:
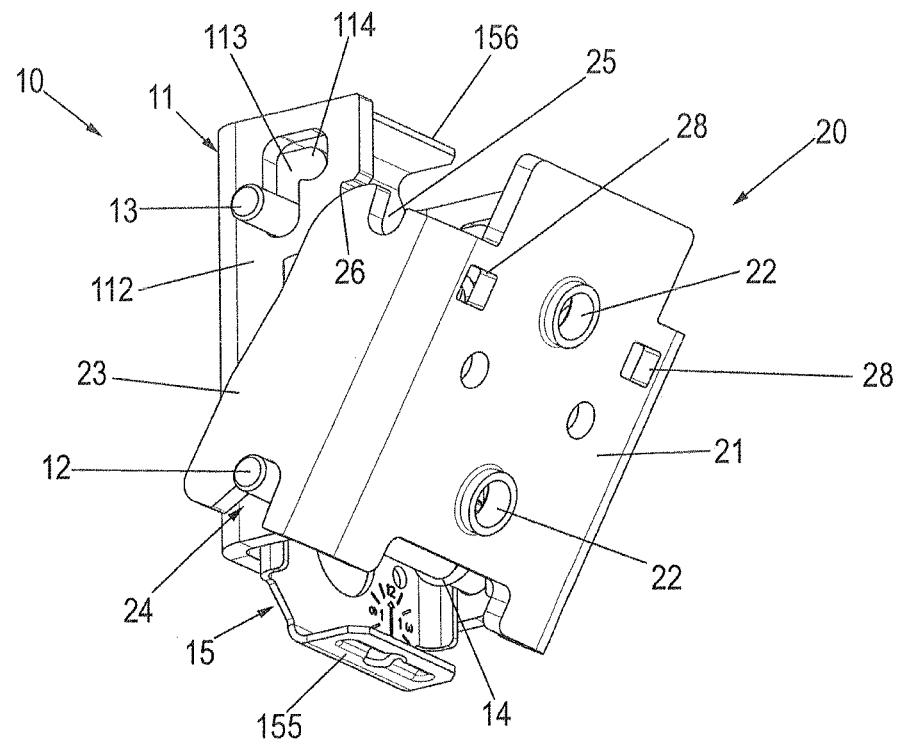
FIG. 6a shows an isometric view of a furniture fitting in a second exemplary embodiment in a latching state.
Figure 6B:
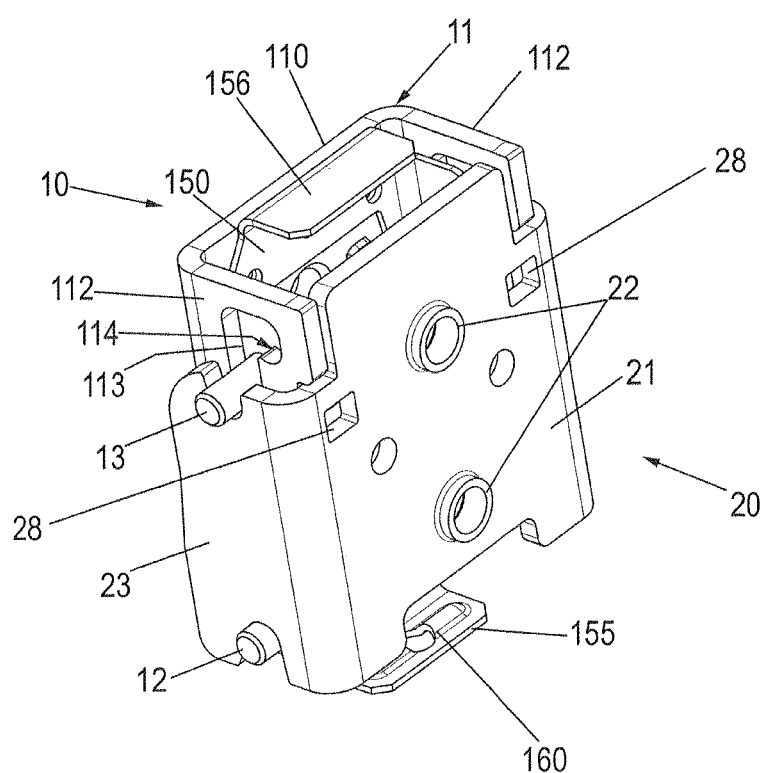

In FIGS. 6a and 6b, the furniture fitting is shown in a respective isometric view in two different stages of a latching operation of its two fitting parts, i.e. the first fitting part 10 and the second fitting part 20.

The first fitting part 10 again has a U-shaped base element 11, with a base 110 and limbs 112, through which a first axle 12 and a second axle 13, which extend laterally over the limbs 112, extend at a distance from each other. In this case, the first axle 12 is stationary in the limb 112, while the second axle 13 can move in an elongated hole 113.

The second fitting part 20 is likewise formed in a U-shaped manner, with a base 21 and limbs 23. In the limbs 23, first recesses 24, which are open to the side edges of the limbs 23, and second recesses 25 are arranged again.

In FIG. 6a, the second fitting part 20 with the first recesses 24 is placed on the first axle 12. As shown in the sequence of FIGS. 5a to 5e in connection with the first exemplary embodiment of the furniture fitting, the second fitting part 20 can be latched by pivoting about the first axle 12 with the first fitting part 10, in that, during the pivoting of the second fitting part 20, the second axle 13 is moved away from the first axle 12 by the guide bevel 26 in the elongated holes 113 and then latches into the second recess 25, which is also referred to as a latching recess, by action of spring force. For this purpose, the first axle 12 and the second axle 13 are moved towards one another by two tension springs 14 in this exemplary embodiment.

It can be clearly seen that the fastening holes 22, which are arranged centrally in the base 21 in this exemplary embodiment, are provided with a collar by a pull-pressure forming method. Thus, for the fastening means, in particular the screws, by means of which the second fitting part 20 is attached to a furniture part, better centring and guiding is achieved, e.g. also by the application of a bottom side of a conical screw head.

Figure 7A:
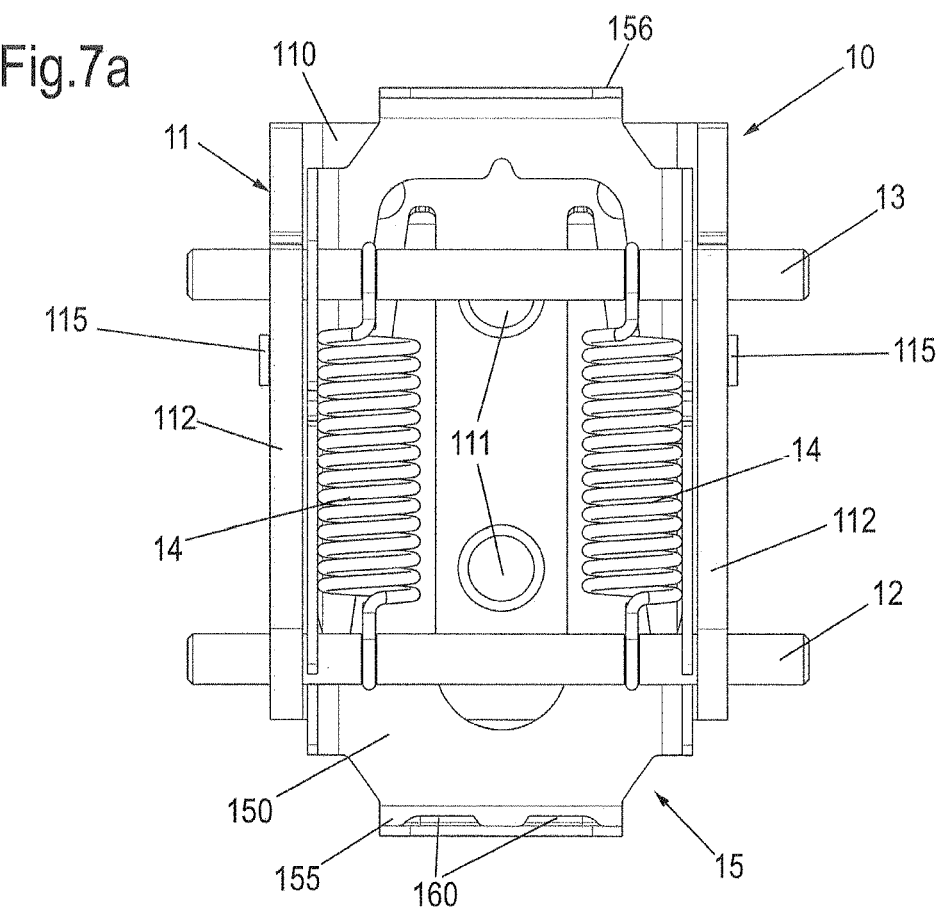
FIG. 7a shows a front view of the first fitting part of the furniture fitting according to FIGS. 6a, b.
Figure 7B:
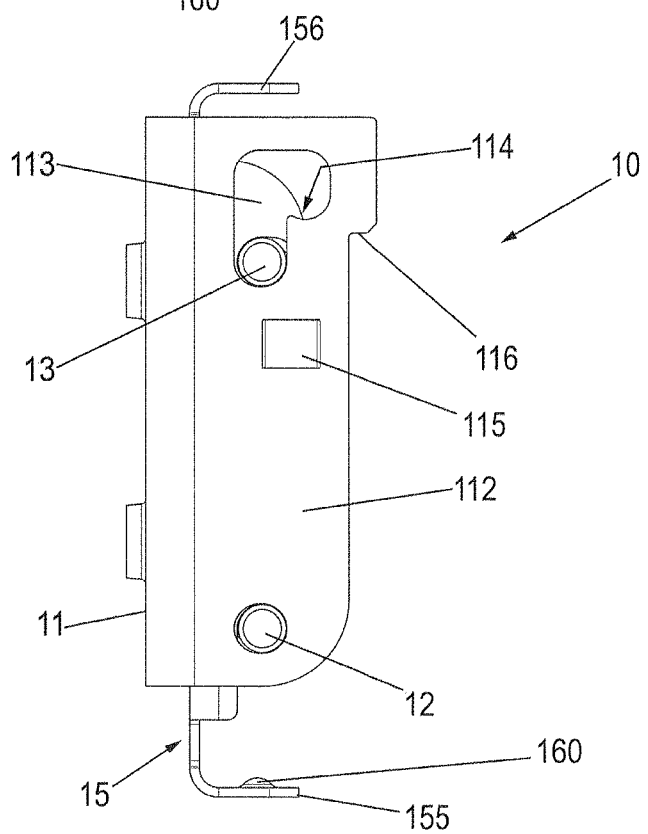
FIG. 7b shows a side view of the first fitting part of the furniture fitting according to FIGS. 6a, b.

In FIGS. 7a and 7b, the first fitting part 10 is shown separately in a respective front and side view. The use of two tension springs 14 instead of one tension spring in the first exemplary embodiment of the furniture fitting, which are arranged closer to the limbs 112 in this case, allows the use of higher spring forces, with which the two axles 12, 13 are moved towards one another without this leading to a possible bending of the axles 12, 13. Due to the use of the two tension springs 14, the fastening holes 111 in the base element 11 are arranged along a central axis of the first fitting part 10. In FIG. 7b, it can be seen that a longitudinal edge of at least one limb 112 has a projection 116 at the end where the elongated hole 113 is introduced, which allows a parallel displacement of the second fitting part 20 to the base 110 in the assembled state in the sense of a stop for the base 21, as already shown in the first exemplary embodiment in FIGS. 3 to 5.

A further difference between the present first fitting part 10 and the first exemplary embodiment is the shaaxleg of the elongated hole 113. In the present exemplary embodiment, this extends in an L-shaped manner with a longer section, which is oriented parallel to the base 110 as in the first exemplary embodiment, and a shorter section that extends transversely, in particular perpendicularly, to the longer section. The transverse section lies on the side of the elongated hole 113 facing away from the first axle 12.

The transverse section of the elongated hole 113 allows a movement of the second axle 13 away from the base 110 after lifting the second axle 13 (relative to the orientation of the first fitting part 10 in the illustration of FIGS. 6 and 7). A set-down position 114 in the form of a trough is formed on the lower side, facing the first axle 12, of the transverse section of the elongated hole 113. In this set-down position 114, the second axle 13 can be deposited. It remains stable in this set-down position 114 since it is pulled into the trough-shaped set-down position 114 by the tension springs 14.

This configuration of the elongated hole 113 in conjunction with the set-down position 114 makes it possible to bring the fitting part 10 into a pretensioned state, by means of which the latching with the second fitting part 20 is simplified. This is explained in more detail in connection with FIGS. 9a to 9c.

Each limb 112 is respectively provided with at least one embossment 115, for example in the form of a bead, in order to achieve a centring and a predetermined gap dimension of these two fitting parts 10, 20 when the first fitting part 10 is joined to the second fitting part 20.

Furthermore, on the outside of the base 21 of the second fitting part 20, two recesses 28 can be seen, which are formed here in a rectangular or square shape, but can also have other shapes. Their function is described in more detail in connection with FIGS. 9a to 9c.

At first, the base element 11, the unlatching plate 15 and the second fitting part 20 are again shown separately in FIGS. 8a to 8c each in an isometric view.

The unlatching plate 15 shown in FIG. 8b is also designed in a U-shaped manner with a base 150 and lateral legs 152 perpendicular thereto. In the upper or lower part (relative to the representation in FIG. 8b), unlatching tabs 155, 156 are bent off, again as in the first exemplary embodiment. As a result of pressure or tension, the unlatching plate 15, and therewith the second axle 13, can be moved on the unlatching tabs 155, 156 in order to be able to release the second fitting part 20 from the first fitting part 10. The second axle 13 is thereby guided through holes 157 in the limbs 152. The second axle 13 has little clearance in the holes 157 so that it moves substantially with the unlatching plate 15. For the first axle 12, recesses 153 are provided in the limbs 152, which allow the unlatching plate 15 to move relatively to the fixed axle 12.

In contrast to the unlatching plate 15 of the first exemplary embodiment, two spring elements 158 are provided which at least move the upper region of the unlatching plate 15, i.e. the region in which the second axle 13 is guided through the holes 157, away from the base 110 of the base element 11 by means of the action of spring force. In this way, a second axle 13 which is lifted in the longitudinal hole 113 against the tensile force of the tension springs 14 (i.e. moved away from the first axle 12) is pressed into the transverse section of the elongated hole 113 so that it is deposited in the set-down position 114 when the second axle 13 is lowered. The two spring elements 158 are formed in the shown exemplary embodiment by spring tongues, which protrude from the base 150 of the unlatching plate 15.

Figure 9C:
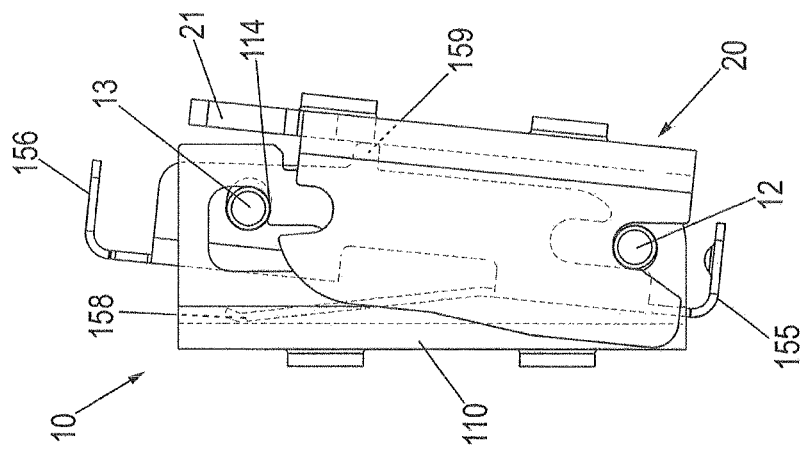
FIG. 9c shows a side view of the first fitting part according to FIG. 9a with the second fitting part attached.
Figure 9B:
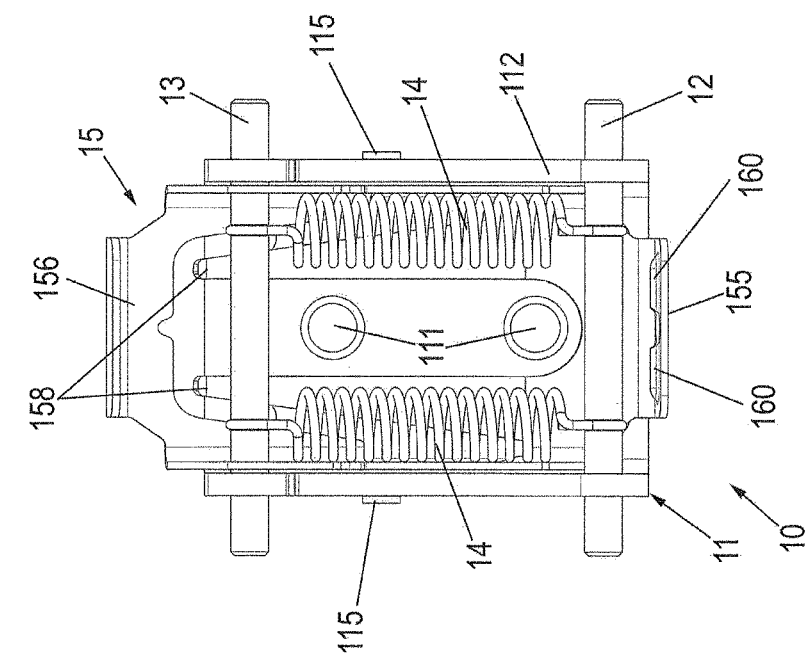
FIG. 9b shows a front view of the first fitting part of the furniture fitting according to FIGS. 6a, b in a pretensioned state.
Figure 9A:
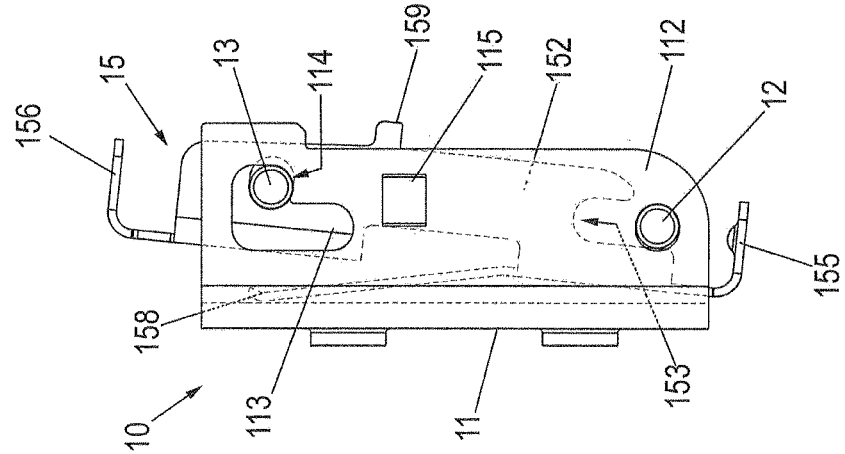
FIG. 9a shows a side view of the first fitting part of the furniture fitting according to FIGS. 6a, b in a pretensioned state.

Furthermore, a protruding nose 159 is formed on the longitudinal edge of each leg 152, the function of which is also explained in conjunction with FIGS. 9a to c.

Two embossings 160 are formed on the unlatching tab 155 in this exemplary embodiment, which are helpful for the centring of an unlatching aid, for example of a screwdriver. Of course, these embossings 160 can also be formed on the unlatching tab 156.

In FIGS. 9a and 9b, the first fitting part 10 of the furniture fitting of the second exemplary embodiment is shown with the second axle 13 in the set-down position 114 in a side view (FIG. 9a) and a front view (FIG. 9b). In the side view of FIG. 9a, hidden lines of the unlatching plate 15 are shown in dashed lines in order to illustrate the arrangement of the unlatching plate 15 in this latching position. In this illustration, it is easy to see how the ends of the spring elements 158, which are designed as flared spring tongues, are supported on the base 110 of the base element 11. Furthermore, it can be clearly seen in the side view that the nose 159 projects beyond the longitudinal edge of the limb 112 of the base element 11.

FIG. 9b shows that, in this pretensioned position of the second axle 13 in the set-down position 114, the two fastening holes 111 are freely accessible. A comparison with FIG. 7a shows that this is not the case in the basic position of the second axle 13. As a result of the possibility of depositing the second axle 13 in the set-down position 114, the fastening holes 111 can be spaced further apart from each other with the same size of the first fitting part 10. Fastening holes which are spaced further apart from each other and thus fastening means which are also spaced further apart from one another and which are guided through the fastening holes 111 experience lower forces in a tilting moment acting on the furniture fitting.

FIG. 9c shows the first fitting part 10 in a side view with the second fitting part 20 attached. The second fitting part 20 is already placed with its first recess 24 in this illustration on the first axle 12 and pivoted in the upper region towards the first fitting part 10. In the illustrated pivoting position, the second fitting part 20 rests with its base 21 against the nose 159. Further pivoting of the second fitting part 20 out of this position leads to a co-movement of the unlatching plate 15 towards the base 110 of the base element 11. By the co-movement of the unlatching plate 15, the second axle 13 is also moved toward the base 110 and thus pushed out of the trough-shaped set-down position 114. As a result, the second axle 13 enters the vertically extending section of the elongated hole 113 and is pulled by the tension springs 14 into the second recess 25, which is formed as a latching recess, of the second fitting part 20. Both fitting parts 10, 20 are then again latched together, as shown in FIG. 6b.

A separation of both fitting parts 10, 20 takes place in such a way that either pressure is applied at first to the unlatching tab 155 or a pull is exerted on the unlatching tab 156, which are each arranged on the unlatching plate 15. The second axle 13 fixed to the unlatching plate 15 thus moves from the lower position of the vertically extending section of the elongated hole 113 and is moved towards the end of the transverse section of the L-shaped elongated hole 113 due to the spring force of the spring members 158. Nearly simultaneously with reaching this position, the noses 159 of the unlatching plate 15 engage in the recesses 28 of the second fitting part 20. The lower edges of the noses 159 thus rest against the lower surfaces of the recesses 28. As a result, the second axle 13 is prevented from changing its position again in the vertical position. The second fitting part 20 can now be completely separated from the first fitting part 10 and the unlatching plate 15 by further pivoting, as a result of which the second axle 13 acting as a latching axle is moved into the set-down position 114 and comes to rest here.

Figure 10C:
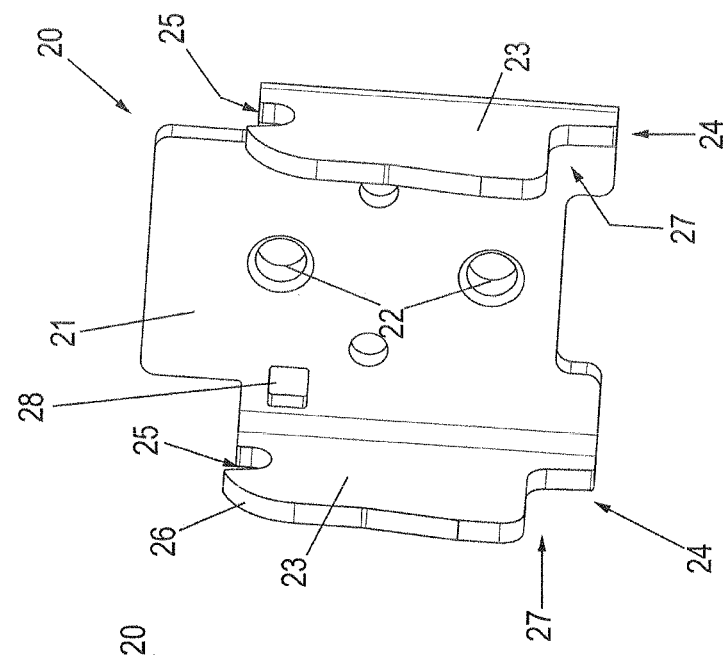
FIG. 10c shows an isometric view of the second fitting part of the furniture fitting according to FIGS. 10a, 10b.
Figure 10B:
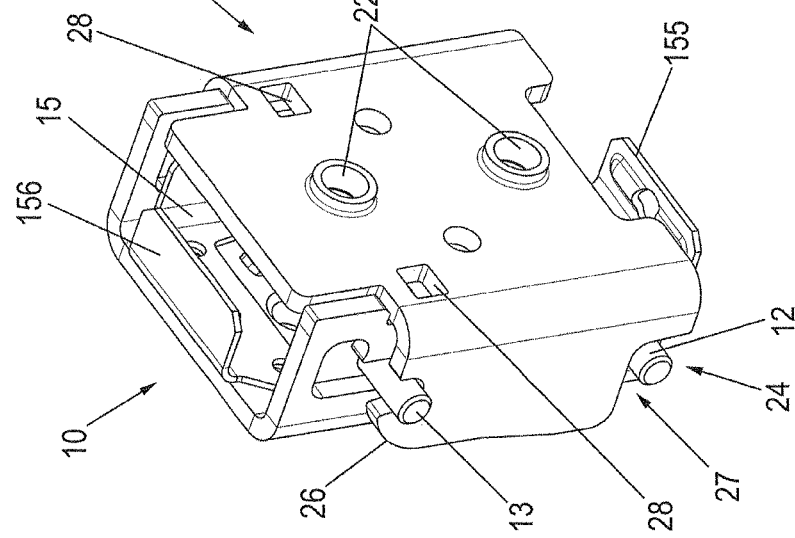
FIG. 10b shows a different isometric view of the furniture fitting in the third exemplary embodiment.
Figure 10A:
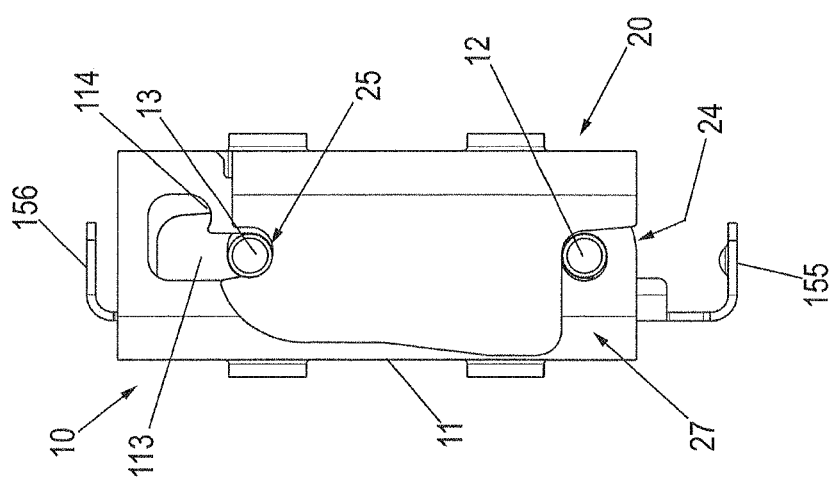
FIG. 10a shows an isometric view of a furniture fitting in a third exemplary embodiment.

FIGS. 10a to 10c show a third exemplary embodiment of a furniture fitting according to the application. Except for the differences described below, this furniture fitting corresponds to that of the second exemplary embodiment, the description of which is hereby incorporated by reference.

FIG. 10a shows a side view of the furniture fitting with first and second fitting parts 10, 20, which are latched onto each other. In FIG. 10 b, the furniture fitting is shown in an isometric view.

The first fitting part 10 in this furniture fitting is structurally identical to the first fitting part of the furniture fitting of the second exemplary embodiment. Both embodiments, however, differ in the second fitting part 20, which is shown separately in an isometric view in FIG. 10c.

In this second fitting part 20, the first recess 24 is not only opened downwards towards the side edge of the limbs 23, but also through the clearance 27 to the longitudinal edge of the limbs 23. As a result, the second fitting part 20 can be placed not only on the axle 12 and pivoted inwardly for latching, but can also be latched to the first fitting part 10 in a linear displacement movement, in which the base 21 of the second fitting part 20 remains essentially parallel to the base 110 of the base element 11.

This is basically possible when the second axle 13 is in the basic position at the beginning of the latching process and is positioned in the lower end of the vertically extending section of the elongated hole 113. However, latching is preferably performed by the described displacement movement when the second axle 13 is in the set-down position 114. In this case, the second fitting part 20 can be moved almost without force onto the first fitting part 10, wherein the latching once again takes place as soon as the unlatching plate 15 is moved along the nose 159 by the second fitting part 20.

Figure 11A:
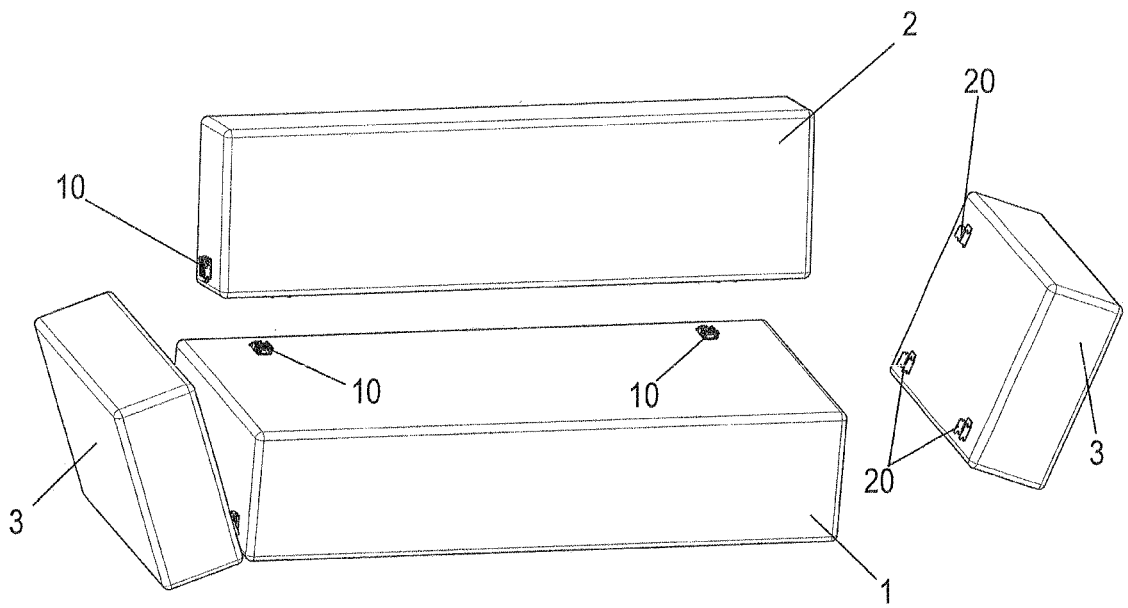
FIG. 11a shows a schematic isometric view of a piece of furniture with several, partly mutually separated furniture parts with furniture fittings.

In FIG. 11a, a sofa is shown as an example of a piece of furniture, comparable to FIG. 1, the individual furniture parts of which are assembled by means of the fittings according to the application. Concretely, the sofa has a seat part 1, a backrest 2 and in each case lateral armrests 3.

Two furniture fittings are provided in the present case by way of example between the seat part 1 and the backrest 2, each with the first fitting part 10 and the second fitting part 20. Each of the armrests 3 is connected to the seat part 1 or the backrest 2 by three furniture fittings, wherein two furniture fittings each, which are arranged in a line, connect each armrest 3 to the seat part 1. A further respective furniture fitting fixes each armrest 3 to the backrest 2.

Figure 11B:
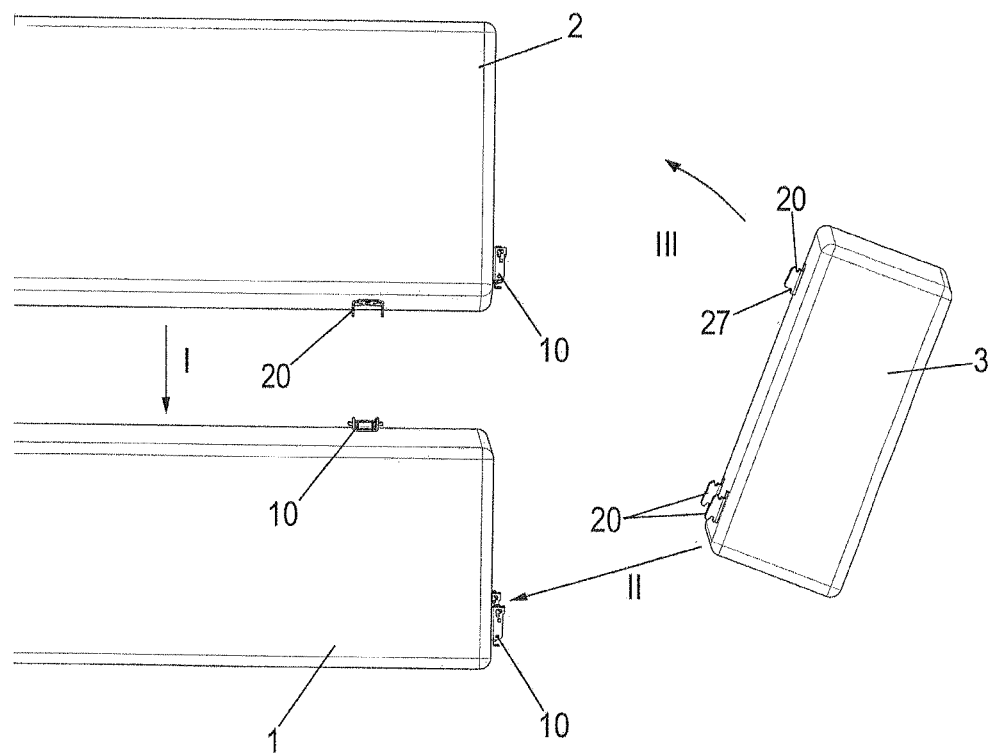

FIG. 11b shows the sequence of assembling the piece of furniture shown in FIG. 11 a. First, as shown by a movement arrow I, the backrest 2 is connected to the seat part 1. The furniture fittings used for this purpose are preferably designed according to the first or second exemplary embodiment, wherein the backrest 2 is initially set such that the first recesses 24 of the second fitting parts 20, which are designed as suspension troughs, are placed on the first axle 12 of the first fitting part 10 and then latch the second fitting parts 20 to the first fitting parts 10 by the pivoting movement of the backrest 2.

In a second step, represented by movement arrow II, the second fitting parts 20, which is are also formed according to the first or second exemplary embodiment and are arranged in the lower section of the armrest 3, are hooked into the corresponding first fitting parts 10, which are arranged on the seat part 1.

The respective armrest 3 is then pivoted to the backrest 2, as indicated by the movement arrow III. This pivoting latches the two lower furniture fittings. On the armrest 3, the upper furniture fitting has a second fitting part 20 with a clearance 27 of the first recess 24. The pivoting movement of the armrest 3 in the direction towards the backrest 2 essentially leads to a displacement movement of the two fitting parts 10, 20 towards each other, which is possible by using the second fitting part 20 with a clearance 27 and leads to mutual latching of the two fitting parts 10, 20.

In contrast to the example shown in FIGS. 1 and 2, it is possible to connect the armrests 3 not only to the seat part 1, but also to the backrest 2 by using the second fitting part 20 with the clearance 27. In general, the second fitting part 20 with clearance 27 allows the use of several furniture fittings for connecting two furniture parts, even if these furniture fittings are not arranged along a line.

FIGS. 12a to c show a fourth exemplary embodiment of a furniture fitting according to the application. Except for the differences described below, this furniture fitting corresponds to that of the first exemplary embodiment, the description of which is hereby incorporated by reference. In particular, the first fitting part 10 in the furniture fitting shown here can be structurally identical to the first fitting part of the furniture fitting of the first exemplary embodiment. Both exemplary embodiments, however, differ in the second fitting part 20.

FIGS. 12a to c each show a side view of the furniture fitting, wherein the second fitting part 20 is shown in different stages of the joining of the two fitting parts 10, 20.

FIG. 12a shows the second fitting part 20 placed on the first axle 12 of the first fitting part 10. The fitting part 20 differs from the previously described one in that the first recess 24 has, next to the actual suspension trough, a trough 29 which is provided upstream thereof and allows applying the second fitting part 20 in the position shown in FIG. 12a. The trough 29 is further spaced from the base 21 than the suspension trough. The angle at which the second fitting part 20 can be placed on the first axle 12 tilted against the first fitting part 10 is less great by this upstream trough 29 than when the first axle 12 is inserted directly into the suspension trough.

FIG. 12b shows the furniture fitting after pivoting the region of the second fitting part 20, which is at the top in the drawing, against the first fitting part 10. After this has been effected and the second axle 13 in the elongated hole 113 has been pressed against the pulling force of the tension springs which are not visible here, the second fitting part 20 is pressed in the lower region against the first fitting part 10, as is shown in FIG. 12c. The first axle 12 exits by means of this pressing the additional upstream trough 29 and the second fitting part 20 slides into its final position in which the first axle 12 is positioned in the suspension trough. The second axle 13 latches into the second recess 25, as in the case of the preceding exemplary embodiments, as a result of which the two fitting parts 10, 20 are completely latched to each other.

LIST OF REFERENCE NUMERALS

1 Seat part
2 Backrest
3 Armrest
10 First fitting part
11 Base element
110 Base
111 Fastening hole
112 Limb
113 Elongated hole
114 Set-down position
115 Embossment
116 Projection
12 First axle (suspension axle)
121 Circumferential groove
122 Shaft retainer
13 Second axle (latching axle)
131 Circumferential groove
132 Shaft retainer
14 Tension spring
15 Unlatching plate
150 Base
151 Opening
152 Limb
153 Recess
154 Guide tab
155 Unlatching tab (pressure)
156 Unlatching tab (tension)
157 Hole
158 Spring element
159 Nose
160 Embossing
20 Second fitting part
21 Base
22 Fastening hole
23 Limb
24 First recess (suspension trough)
25 Second recess (latching trough)
26 Guide bevel
27 Clearance
28 Recess
29 Trough

What is claimed is:
1. A furniture fitting for connecting furniture parts of upholstered furniture, comprising:
a first fitting part that fastens to a first furniture part and a second fitting part that fastens to a second furniture part, wherein the first fitting part has a U-shaped base element comprising a base and two limbs, and two axles arranged parallel to one another and parallel to the base, wherein a first one of the axles is fixedly connected to the first fitting part and a second one of the two axles is mounted to the first fitting part through elongated holes in the limbs of the first fitting part so as to be displaceable relative to the first axle in a direction perpendicular to the two axles against a force of an energy storage device in the form of a tension spring connected to the first and second axles of the two axles, wherein the second fitting part has a first recess for receiving the first axle, and a second recess for receiving the second axle of the two axles, wherein the second fitting part is positioned on the first axle with the first recess so that the second fitting part is pivotable around the first axle, and the second axle latches into the second recess during pivoting of the second fitting part around the first axle to connect the two fitting parts to each other, and wherein the axles penetrate the two limbs and each protrude on either side over outer surfaces of the two limbs.

2. A furniture fitting according to claim 1, wherein a projection is formed on at least one of the two limbs of the base element of the first fitting part, said projection allowing a parallel displacement of the second fitting part relative to the base element in the joined state of the furniture fitting.

3. A furniture fitting according to claim 1, wherein the second fitting part is formed in a U-shaped manner with a base and limbs, with the first recess and second recess being formed in the two limbs.

4. A furniture fitting according to claim 3, wherein the first recess and the second recess are each arranged on opposite side edges of the two limbs of the second fitting part and are respectively open towards the side edges.

5. A furniture fitting according to claim 4, wherein the first recess widens in a V-shaped manner towards a respective one of the side edges.

6. A furniture fitting according to claim 4, wherein an additional trough is formed on a side of the first recess facing away from the base of the second fitting part.

7. A furniture fitting according to claim 4, wherein the first recess is open in a direction of a longitudinal edge of the two limbs of the second fitting part.

8. A furniture fitting according to claim 3, wherein a guide bevel for the second axle is provided on a free longitudinal side of a respective limb of the two limbs of the second fitting part in a region of the second recess.

9. A furniture fitting according to claim 1, wherein the elongated holes are L-shaped in the two limbs of the base element, with a section of the respective elongated holes extending transversely to the base of the base element and providing a set-down position for the second axle in a tensioned state of the tension spring.

10. A piece of furniture with at least two furniture parts, wherein the piece of furniture has at least one furniture fitting according to claim 1, for connecting the at least two furniture parts.

11. A furniture fitting for connecting furniture parts of upholstered furniture, comprising:
a first fitting part that fastens to a first furniture part and a second fitting part that fastens to a second furniture part,
wherein the first fitting part has a base element and two axles arranged parallel to one another and parallel to the base element,
wherein a first one of the axles is fixedly connected to the first fitting part and a second one of the two axles is mounted to the first fitting part through elongated holes in the first fitting part so as to be displaceable relative to the first axle in a direction perpendicular to the two axles against the force of an energy storage device in the form of a tension spring connected to the first and second axles of the two axles,
wherein the second fitting part has a first recess for receiving the first axle, and a second recess for receiving the second axle,
wherein the second fitting part is positioned on the first axle with the first recess so that the second fitting part is pivotable around the first axle, and the second axle latches into the second recess during pivoting of the second fitting part around the first axle to connect the two fitting parts to each other, and
wherein a U-shaped unlatching plate with a base and unlatching plate limbs is inserted into the base element and is connected by the unlatching plate limbs to the second axle and is displaceable against the first axle and the base element.

12. A furniture fitting according to claim 11, wherein guide tabs protrude from the base, and wherein the guide tabs form an at least lateral guide for the tension spring.

13. A furniture fitting according to claim 11, wherein at least one unlatching tab is formed on at least one side of the base of the unlatching plate that extends at a right angle to the two limbs.

14. A furniture fitting according to claim 11, wherein the unlatching plate comprises at least one spring element for pressing the unlatching plate away from the base of a base element at least in a region of the second axle and for holding the second axle in the set-down position and/or for moving it into the set-down position.

15. A furniture fitting according to claim 14, wherein the at least one spring element is a spring tongue which protrudes from the base of the unlatching plate.

16. A furniture fitting according to claim 11, wherein one or more of the base element, the unlatching plate and the second fitting part are made of sheet metal in a punching and bending process.

* * * * *